(12) United States Patent
Wang et al.

(10) Patent No.: US 12,483,005 B2
(45) Date of Patent: Nov. 25, 2025

(54) SEMICONDUCTOR STRUCTURE AND METHOD FOR MANUFACTURING SAME

(71) Applicants: SUZHOU EVERBRIGHT PHOTONICS CO., LTD., Jiangsu (CN); EVERBRIGHT INSTITUTE OF SEMICONDUCTOR PHOTONICS CO., LTD., Jiangsu (CN)

(72) Inventors: Jun Wang, Suzhou (CN); Shaoyang Tan, Suzhou (CN); Li Zhou, Suzhou (CN); Bangguo Wang, Suzhou (CN); Yintao Guo, Suzhou (CN); Xinsheng Liao, Suzhou (CN); Quanling Li, Suzhou (CN)

(73) Assignees: SUZHOU EVERBRIGHT PHOTONICS CO., LTD. (CN); EVERBRIGHT INSTITUTE OF SEMICONDUCTOR PHOTONICS CO., LTD. (CN)

( * ) Notice: Subject to any disclaimer, the term of this patent is extended or adjusted under 35 U.S.C. 154(b) by 0 days.

(21) Appl. No.: 17/924,311

(22) PCT Filed: Jul. 20, 2022

(86) PCT No.: PCT/CN2022/106857
§ 371 (c)(1),
(2) Date: Nov. 9, 2022

(87) PCT Pub. No.: WO2023/115926
PCT Pub. Date: Jun. 29, 2023

(65) Prior Publication Data
US 2024/0222939 A1 Jul. 4, 2024

(30) Foreign Application Priority Data
Dec. 21, 2021 (CN) .......................... 202111565701.6

(51) Int. Cl.
  *H01S 5/20* (2006.01)
  *H01S 5/32* (2006.01)
(52) U.S. Cl.
  CPC .......... *H01S 5/2031* (2013.01); *H01S 5/2018* (2013.01); *H01S 5/3213* (2013.01)
(58) Field of Classification Search
  CPC ........ H01S 5/20; H01S 5/2004; H01S 5/2018; H01S 5/2031; H01S 5/3213
  See application file for complete search history.

(56) References Cited

U.S. PATENT DOCUMENTS 3,785,311 A   1/1974 Yoshikawa
5,727,012 A * 3/1998 Baillargeon ........... B82Y 20/00
                                                372/75

(Continued)

FOREIGN PATENT DOCUMENTS

CN   104242058 A   12/2014
CN   103346226 A    8/2016

(Continued)

OTHER PUBLICATIONS

China National Intellectual Property Administration; International Search Report and Written Opinion issued in Int'l App. No. PCT/CN2022/106857; dated Oct. 27, 2022; 13 pages.

(Continued)

*Primary Examiner* — James A Menefee
(74) *Attorney, Agent, or Firm* — MASCHOFF BRENNAN

(57) ABSTRACT

A semiconductor structure and a method for manufacturing a semiconductor structure are provided. The semiconductor structure includes: a semiconductor substrate layer; an N-type waveguide structure arranged on the semiconductor substrate layer; and an active layer arranged on a surface of the N-type waveguide structure on a side away from the (Continued)

semiconductor substrate layer. The N-type waveguide structure includes a first N-type waveguide layer and a second N-type waveguide layer that are stacked. The second N-type waveguide layer is arranged between the first N-type waveguide layer and the active layer. A conduction band level of the first N-type waveguide layer is the same as a conduction band level of the second N-type waveguide layer. A valence band level of the first N-type waveguide layer is lower than a valence band level of the second N-type waveguide layer. The semiconductor structure increases light emitting efficiency.

14 Claims, 4 Drawing Sheets

(56) References Cited

U.S. PATENT DOCUMENTS

| | | | |
|---|---|---|---|
| 6,785,311 | B1 | 8/2004 | Najda |
| 6,829,272 | B1 | 12/2004 | Najda |
| 7,903,711 | B1 | 3/2011 | Hasenberg et al. |
| 11,011,660 | B1 * | 5/2021 | Derkacs ................ H10F 71/139 |
| 2005/0083979 | A1 | 4/2005 | Leary et al. |
| 2018/0375290 | A1 | 12/2018 | Miyasaka |
| 2019/0148916 | A1 * | 5/2019 | Nakatani ............. H01S 5/34353 |
| | | | 372/44.01 |

FOREIGN PATENT DOCUMENTS

| | | | | |
|---|---|---|---|---|
| CN | 109103746 A | | 12/2018 | |
| CN | 210838449 U | | 6/2020 | |
| JP | H06-209139 A | * | 7/1994 | ........... H01S 5/3213 |
| JP | 5136528 A | | 11/2021 | |
| JP | 2001313442 A | | 1/2022 | |

OTHER PUBLICATIONS

China National Intellectual Property Administration; First Office Action issued in CN App. No. 2021115657016 dated Jan. 25, 2022; 13 pages.

* cited by examiner

SEMICONDUCTOR STRUCTURE AND METHOD FOR MANUFACTURING SAME

This application claims priority to Chinese Patent Application No. 202111565701.6, filed with the China National Intellectual Property Administration on Dec. 21, 2021, and entitled "SEMICONDUCTOR STRUCTURE AND METHOD FOR MANUFACTURING SAME", which is incorporated herein by reference in its entirety.

TECHNICAL FIELD

This application relates to the semiconductor field, and specifically, to a semiconductor structure and a method for manufacturing the same.

BACKGROUND

A light emitting semiconductor structure is a device that produces stimulated emission by using a certain semiconductor material as an operating substance. The operating principle of the light emitting semiconductor structure is as follows: In a certain stimulation manner, population inversion of non-equilibrium carriers is implemented between energy bands (conduction bands and valence bands) of a semiconductor material, or between an energy band of a semiconductor material and an energy level of an impurity (an acceptor or a donor). When a large quantity of electrons in a state of population inversion are recombined with holes, stimulated emission is generated. The light emitting semiconductor structure is widely used due to a small size and high electro-optical conversion efficiency.

However, light emitting efficiency of an existing light emitting semiconductor structure needs to be increased.

SUMMARY OF THE INVENTION

A technical problem to be resolved by this application is to resolve a problem of relatively low light emitting efficiency of a semiconductor structure in the prior art.

To resolve the foregoing technical problem, this application provides a semiconductor structure, including: a semiconductor substrate layer; an N-type waveguide structure arranged on the semiconductor substrate layer; and an active layer arranged on a surface of the N-type waveguide structure on a side away from the semiconductor substrate layer. The N-type waveguide structure includes a first N-type waveguide layer and a second N-type waveguide layer that are stacked, the second N-type waveguide layer is arranged between the first N-type waveguide layer and the active layer, a conduction band level of the first N-type waveguide layer is the same as a conduction band level of the second N-type waveguide layer, and a valence band level of the first N-type waveguide layer is lower than a valence band level of the second N-type waveguide layer.

Optionally, a difference between the valence band level of the second N-type waveguide layer and the valence band level of the first N-type waveguide layer ranges from 0.04 eV to 0.3 eV.

Optionally, a material of the first N-type waveguide layer includes $Al_{x1}Ga_{x2}In_{1-x1-x2}P$ doped with N-type conductive ions, and a material of the second N-type waveguide layer includes $Al_yGa_{1-y}As$ doped with N-type conductive ions.

Optionally, a value of x1 ranges from 0 to 0.2, and a value of y ranges from 0.2 to 0.5.

Optionally, a thickness of the first N-type waveguide layer is greater than a thickness of the second N-type waveguide layer.

Optionally, the semiconductor structure further includes: a first confining layer arranged between the N-type waveguide structure and the semiconductor substrate layer, where a difference between the conduction band level of the first N-type waveguide layer and a conduction band level of the first confining layer is less than a difference between the valence band level of the first N-type waveguide layer and a valence band level of the first confining layer.

Optionally, a material of the first confining layer is $Al_{x3}Ga_{x4}In_{1-x3-x4}P$ doped with N-type conductive ions.

Optionally, the semiconductor structure further includes: a P-type waveguide layer arranged on a surface of the active layer on a side away from the semiconductor substrate layer, and a second confining layer arranged on a surface of the P-type waveguide layer on a side away from the semiconductor substrate layer, where a difference between a valence band level of the second confining layer and a valence band level of the P-type waveguide layer is less than a difference between a conduction band level of the second confining layer and a conduction band level of the P-type waveguide layer.

Optionally, a material of the P-type waveguide layer includes $Al_{z1}Ga_{1-z1}As$ doped with P-type conductive ions, and a material of the second confining layer includes $Al_{z2}Ga_{1-z2}As$ doped with P-type conductive ions.

Optionally, a thickness of the P-type waveguide layer is less than a thickness of the N-type waveguide structure.

This application further provides a method for manufacturing a semiconductor structure, including: providing a semiconductor substrate layer; and forming an N-type waveguide structure on the semiconductor substrate layer, where a process for forming the N-type waveguide structure includes: forming a first N-type waveguide layer on the semiconductor substrate layer; forming a second N-type waveguide layer on a surface of the first N-type waveguide layer on a side away from the semiconductor substrate layer, where a conduction band level of the first N-type waveguide layer is the same as a conduction band level of the second N-type waveguide layer, and a valence band level of the first N-type waveguide layer is lower than a valence band level of the second N-type waveguide layer; and forming an active layer on a surface of the N-type waveguide structure on a side away from the semiconductor substrate layer.

Optionally, a material of the first N-type waveguide layer includes $Al_{x1}Ga_{x2}In_{1-x1-x2}P$ doped with N-type conductive ions, and a material of the second N-type waveguide layer includes $Al_yGa_{1-y}As$ doped with N-type conductive ions; and processes for forming the first N-type waveguide layer and the second N-type waveguide layer include: step 1: introducing an indium source gas, a gallium source gas, an aluminum source gas and a phosphorus source gas; step 2: turning off the indium source gas; step 3: turning off the gallium source gas and the aluminum source gas; step 4: turning off the phosphorus source gas; step 5: introducing an arsenic source gas; and step 6: introducing the gallium source gas and the aluminum source gas.

Optionally, a time between an end moment of step 2 and an end moment of step 3 ranges from 0.2 seconds to 3 seconds; a time between the end moment of step 3 to an end moment of step 4 ranges from 0.1 seconds to 30 seconds; and a duration of step 5 ranges from 0.1 seconds to 30 seconds.

Optionally, the method further includes: forming a first confining layer on the semiconductor substrate layer before forming the N-type waveguide structure, where a difference between the conduction band level of the first N-type waveguide layer and a conduction band level of the first confining layer is less than a difference between the valence band level of the first N-type waveguide layer and a valence band level of the first confining layer.

Optionally, the method further includes: forming a P-type waveguide layer on a surface of the active layer on a side away from the semiconductor substrate layer; forming a second confining layer on a surface of the P-type waveguide layer on a side away from the semiconductor substrate layer, where a difference between a valence band level of the second confining layer and a valence band level of the P-type waveguide layer is less than a difference between a conduction band level of the second confining layer and a conduction band level of the P-type waveguide layer.

Optionally, a thickness of the P-type waveguide layer is less than a thickness of the N-type waveguide structure. The technical solutions of this application have the following advantages:

Based on the semiconductor structure provided in the technical solutions of this application, the N-type waveguide structure includes a first N-type waveguide layer and a second N-type waveguide layer that are stacked, the second N-type waveguide layer is arranged between the first N-type waveguide layer and the active layer, the conduction band level of the first N-type waveguide layer is the same as the conduction band level of the second N-type waveguide layer, and the valence band level of the first N-type waveguide layer is lower than the valence band level of the second N-type waveguide layer. The conduction band level of the first N-type waveguide layer is the same as the conduction band level of the second N-type waveguide layer. Therefore, no barrier to electrons exists in the N-type waveguide structure, and in the N-type waveguide structure, an electron conduction capability is better and more electrons can be conducted to the active layer. Secondly, the valence band level of the first N-type waveguide layer is lower than the valence band level of the second N-type waveguide layer, so that the first N-type waveguide layer can block holes from being conducted from the active layer to the N-type waveguide structure, thereby suppressing hole leakage. In this case, more holes can be arranged in the active layer, thereby enhancing efficiency of recombining holes and electrons, and improving light emitting efficiency, especially the light emitting efficiency of the semiconductor structure whose emission wavelength ranges within 700 nm to 850 nm.

BRIEF DESCRIPTION OF THE DRAWINGS

To more clearly illustrate the specific implementation manners of this application or the technical solutions in the prior art, the following briefly describes the accompanying drawings that are required for describing the specific implementation manners or the prior art.

Obviously, the accompanying drawings described below are some implementation manners of this application. For those of ordinary skill in the art, other accompanying drawings may also be obtained based on the accompanying drawings without any creative effort.

DETAILED DESCRIPTION

Figure 1:
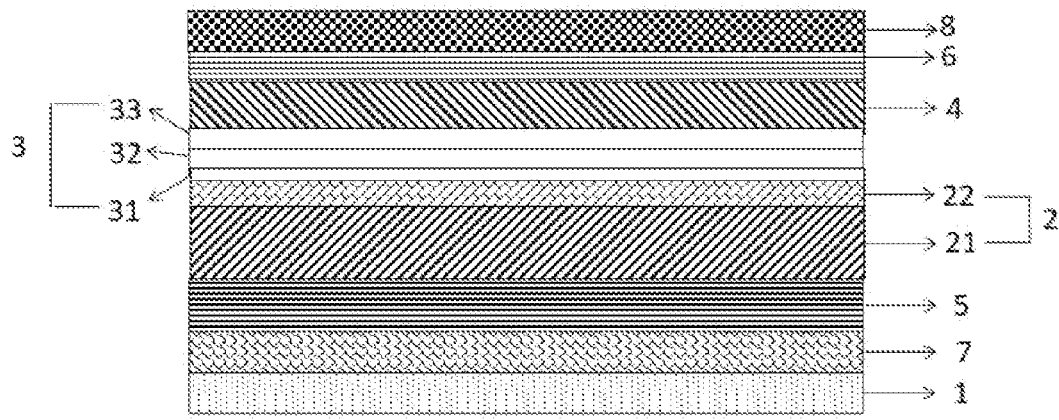
FIG. 1 is a schematic structural diagram of a semiconductor structure according to this application.

An embodiment of this application provides a semiconductor structure. Referring to FIG. 1, the semiconductor structure includes: a semiconductor substrate layer 1;
 an N-type waveguide structure 2 arranged on the semiconductor substrate layer 1; and
 an active layer 3 arranged on a surface of the N-type waveguide structure 2 on a side away from the semiconductor substrate layer 1, where the N-type waveguide structure 2 includes a first N-type waveguide layer 21 and a second N-type waveguide layer 22 that are stacked, and
 the second N-type waveguide layer 22 is arranged between the first N-type waveguide layer 21 and the active layer 3, a conduction band level of the first N-type waveguide layer 21 is the same as a conduction band level of the second N-type waveguide layer 22, and a valence band level of the first N-type waveguide layer 21 is lower than a valence band level of the second N-type waveguide layer 22 (referring to FIG. 2).

The conduction band level of the first N-type waveguide layer 21 is the same as the conduction band level of the second N-type waveguide layer 22. Therefore, no barrier to electrons exists in the N-type waveguide structure 2, and in the N-type waveguide structure 2, an electron conduction capability is better and more electrons can be conducted to the active layer 3. Secondly, the valence band level of the first N-type waveguide layer 21 is lower than the valence band level of the second N-type waveguide layer 22, so that the first N-type waveguide layer 21 can block holes from being conducted from the active layer 3 to the N-type waveguide structure 2, thereby suppressing hole leakage. In this case, more holes can be arranged in the active layer 3, thereby enhancing efficiency of recombining holes and electrons, and improving light emitting efficiency.

In this embodiment, an example in which the semiconductor structure is an edge-emitting semiconductor laser is used. In this embodiment, a material of the semiconductor substrate layer 1 includes a gallium arsenide (GaAs). In another embodiment, a material of the semiconductor substrate layer 1 may further be another material.

In an embodiment, a difference between the valence band level of the second N-type waveguide layer 22 and the valence band level of the first N-type waveguide layer 21 ranges from 0.04 eV to 0.3 eV, for example, 0.096 eV. If the difference between the valence band level of the second N-type waveguide layer 22 and the valence band level of the first N-type waveguide layer 21 is less than 0.04 eV, a degree to which the first N-type waveguide layer 21 can block holes from being conducted from the active layer 3 to the N-type waveguide structure 2 is weakened. If the difference between the valence band level of the second N-type waveguide layer 22 and the valence band level of the first N-type waveguide layer 21 is greater than 0.3 eV, a width of a forbidden band of the first N-type waveguide layer 21 is excessively large, to increase a resistance of a bulk material of the first N-type waveguide layer 21.

In an embodiment, the material of the first N-type waveguide layer 21 includes $Al_{x1}Ga_{x2}In_{1-x1-x2}P$ doped with N-type conductive ions. A material of the second N-type waveguide layer includes $Al_yGa_{1-y}As$ doped with N-type conductive ions.

In an embodiment, in $Al_{x1}Ga_{x2}In_{1-x1-x2}P$, a sum of x1 and x2 is 0.5. Specifically, a molar component content of x1 is 0 to 0.2, for example, 0.1 or 0.15; and a molar component content of x2 is 0.3 to 0.5, for example, 0.4 or 0.35. In $Al_yGa_{1-y}As$, a value range of y is 0.2 to 0.5, for example, 0.3 or 0.4.

Figure 2:
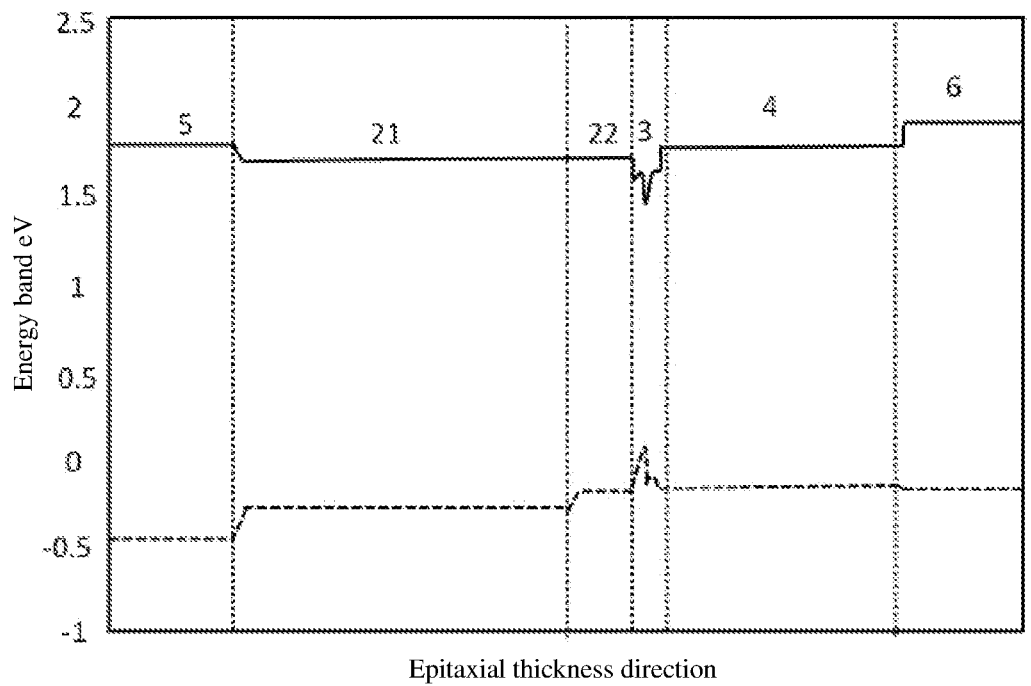
FIG. 2 is a diagram of a conduction band level and a valence band level of a semiconductor structure according to this application.

FIG. 2 is an energy band diagram of a semiconductor structure in this embodiment. A horizontal axis in FIG. 2 is a position in an epitaxial thickness direction, and a first confining layer 5, the first N-type waveguide layer 21, the second N-type waveguide layer 22, the active layer 3, a P-type waveguide layer 4 and a second confining layer 6 are on the horizontal axis from left to right.

Referring to FIG. 2, a band gap of the second N-type waveguide layer 22 is smaller than that of the first N-type waveguide layer 21. Based on designs of different material systems and component designs of the first N-type waveguide layer 21 and the second N-type waveguide layer 22, the band gap of the second N-type waveguide layer 22 is enabled to be smaller than the band gap of the first N-type waveguide layer 21, the conduction band level of the first N-type waveguide layer 21 is the same as the conduction band level of the second N-type waveguide layer 22, and the valence band level of the first N-type waveguide layer 21 is lower than the valence band level of the second N-type waveguide layer 22.

In an embodiment, a thickness of the first N-type waveguide layer 21 is greater than a thickness of the second N-type waveguide layer 22. A resistivity of the bulk material of the first N-type waveguide layer 21 is less than a resistivity of a bulk material of the second N-type waveguide layer 22. Therefore, the thickness of the first N-type waveguide layer 21 is designed to be greater than the thickness of the second N-type waveguide layer 22. Under a condition that a total thickness of the N-type waveguide structure remains unchanged, a ratio of the thickness of the first N-type waveguide layer 21 is increased, so that the resistance of the bulk material of the first N-type waveguide layer 21 is reduced.

In an embodiment, the thickness of the second N-type waveguide layer 22 is 0.1 times to 1 time the thickness of the first N-type waveguide layer 21, for example, 0.2 times. If the thickness of the second N-type waveguide layer 22 is less than 0.1 times of the thickness of the first N-type waveguide layer 21, the formed second N-type waveguide layer 22 is excessively thin, and eventually, performance of the active layer 3 is affected, for example, growth quality of the active layer 3 is adversely affected. If the thickness of the second N-type waveguide layer 22 is greater than 1 time the thickness of the first N-type waveguide layer 21, the formed second N-type waveguide layer 21 is excessively thick, and a bulk resistance of the semiconductor structure eventually formed is not sufficiently reduced.

In an embodiment, the thickness of the first N-type waveguide layer 21 is 0.1 μm to 2 μm, for example, 1 μm; and the thickness of the second N-type waveguide layer 22 is 0.05 μm to 0.5 μm, for example, 0.1 μm. In an embodiment, a doping concentration of the second N-type waveguide layer 22 is 0.5E17 atom/$cm^3$ to 10E17 atom/$cm^3$. A doping concentration of the first N-type waveguide layer 21 is 0.5E17 atom/$cm^3$ to 10E17 atom/$cm^3$.

The semiconductor structure further includes: a first confining layer 5. The first confining layer 5 is arranged between the N-type waveguide structure 2 and the semiconductor substrate layer 1. The first confining layer 5 comes into contact with the first N-type waveguide layer 21.

Referring to FIG. 2, a difference between the conduction band level of the first N-type waveguide layer 21 and a conduction band level of the first confining layer 5 is less than a difference between the valence band level of the first N-type waveguide layer 21 and a valence band level of the first confining layer 5, and a transmission barrier of electrons on a conduction band of the first N-type waveguide layer 21 and a conduction band of the first confining layer 5 is relatively small, so that a junction resistance between the first confining layer 5 and the first N-type waveguide layer 21 is relatively small. In this embodiment, the material of the first N-type waveguide layer 21 includes $Al_{x1}Ga_{x2}In_{1-x1-x2}P$ doped with N-type conductive ions, and the material of the first confining layer is $Al_{x3}Ga_{x4}In_{1-x3-x4}P$ doped with N-type conductive ions, where x3 is greater than x1. Based on a material of an AlGaInP system, when a component of Al changes, a difference between conduction band levels of AlGaInP with different Al components is smaller than a difference between valence band levels. This is conducive to electron transmission.

In an embodiment, in $Al_{x3}Ga_{x4}In_{1-x3-x4}P$, a sum of x3 and x4 is 0.5. Specifically, a molar component content of x3 is 0 to 0.4, for example, 0.3; a molar component content of x4 is 0.1 to 0.5, for example, 0.2; a thickness of the first confining layer 5 is 0.5 μm to 2 μm, for example, 1 μm; and a doping concentration of the N-type conductive ions in the first confining layer 5 is 0.5E18 atom/$cm^3$ to 4E18 atom/$cm^3$.

The semiconductor structure further includes: a P-type waveguide layer 4 arranged on a surface of the active layer 3 on a side away from the semiconductor substrate layer 1, and a second confining layer 6 arranged on a surface of the P-type waveguide layer 4 on a side away from the semiconductor substrate layer 1.

Referring to FIG. 2, a difference between a valence band level of the second confining layer 6 and a valence band level of the P-type waveguide layer 4 is less than a difference between a conduction band level of the second confining layer 6 and a conduction band level of the P-type waveguide layer 5. A barrier for a hole to be transmitted on valence bands of the P-type waveguide layer 4 and the second confining layer 6 is relatively small, so that a junction resistance between the second confining layer 6 and the P-type waveguide layer 4 is relatively small. In this embodiment, a material of the P-type waveguide layer 4 includes $Al_{z1}Ga_{1-z1}As$ doped with P-type conductive ions, and a material of the second confining layer 6 includes $Al_{z2}Ga_{1-z2}As$ doped with P-type conductive ions, where z2 is greater than z1. Based on a material of an AlGaAs system, when a component of Al changes, a difference between valence band levels of AlGaAs with different Al components is smaller than a difference between conduction band levels. This is conducive to hole transmission.

Referring to FIG. 2, the difference between the valence band level of the second confining layer 6 and the valence band level of the P-type waveguide layer 4 is less than the difference between the valence band level of the first N-type waveguide layer 21 and the valence band level of the first confining layer 5. The difference between the conduction band level of the first N-type waveguide layer 21 and the conduction band level of the first confining layer 5 is less than the difference between the conduction band level of the second confining layer 6 and the conduction band level of the P-type waveguide layer 4.

In an embodiment, in $Al_{z1}Ga_{1-z1}As$, a molar component content of z1 is 0.2 to 0.5, for example, 0.3 or 0.4, and a thickness of the P-type waveguide layer 4 is 0.1 μm to 1 μm, for example, 0.2 μm or 0.5 μm. In an embodiment, in $Al_{z2}Ga_{1-z2}As$, a molar component content of z2 is 0.5 to 0.9, for example, 0.6; a thickness of the second confining layer 6 is 0.5 μm to 2 μm, for example, 1 μm; and a doping concentration of the second confining layer 6 is 0.5E18 atom/cm³ to 4E18 atom/cm³.

In an embodiment, the active layer 3 includes: a first barrier layer 31, a quantum well layer 32, and a second barrier layer 33. The first barrier layer 31 is arranged on a surface of the N-type waveguide structure 2 on a side away from the semiconductor substrate layer 1, the quantum well layer 32 is arranged on a surface of the first barrier layer 31 on a side away from the semiconductor substrate layer 1, and the second barrier layer 33 is arranged on a surface of the quantum well layer 32 on a side away from the first barrier layer 31.

In an embodiment, a material of the first barrier layer 31 includes $Al_{k1}Ga_{1-k1}As$.

In an embodiment, a molar component content of Al in the first barrier layer 31 is 0 to 0.4, for example, 0.2.

In an embodiment, a thickness of the first barrier layer is 5 nm to 20 nm, for example 10 nm. The first barrier layer 31 is not doped.

In an embodiment, a material of the quantum well layer 32 includes GaAsP, and a thickness of the quantum well layer 32 is 5 nm to 10 nm, for example, 6 nm. The quantum well layer 32 is not doped.

In an embodiment, a material of the second barrier layer 33 includes $Al_{k2}Ga_{1-k2}As$, and a molar component content of k2 in $Al_{k2}Ga_{1-k2}As$ is 0.05 to 0.4, for example, 0.2. A thickness of the second barrier layer 33 is 5 nm to 20 nm, for example, 10 nm.

The second barrier layer 33 is not doped.

In an embodiment, the thickness of the P-type waveguide layer 4 is less than the thickness of the N-type waveguide structure 2. Further, the thickness of the P-type waveguide layer 4 is less than that of the first N-type waveguide layer.

In this embodiment, the thickness of the P-type waveguide layer 4 is relatively small. Therefore, a resistivity of a bulk material of the P-type waveguide layer 4 is greater than a resistivity of a bulk material of the first N-type waveguide layer 21, and a proportion of a bulk resistance of the P-type waveguide layer 4 is also reduced.

In this embodiment, the thickness of the N-type waveguide structure 2 is relatively larger than the thickness of the P-type waveguide layer 4. That is, the semiconductor structure uses an asymmetric waveguide. A light field distribution peak is arranged in the N-type waveguide structure 2, and more light propagates in the N-type waveguide structure 2. However, light losses in the N-type waveguide structure 2 are less than those in the P-type waveguide layer 4. Therefore, when the light field distribution peak is arranged in the N-type waveguide structure 2, light propagation losses are reduced, so that enough modal gains can be obtained to reach a stimulated emission condition.

Further, the thickness of the first N-type waveguide layer 21 is greater than the thickness of the second N-type waveguide layer 22, and a light field distribution peak is arranged in the first N-type waveguide layer 21. Therefore, more light propagates in the first N-type waveguide layer 21.

In this embodiment, a carrier concentration in the active layer 3 is relatively high during operation, and a junction resistance between the second N-type waveguide layer 22 and the P-type waveguide layer 4 is determined based on a width of a forbidden band of the second N-type waveguide layer 22 and a width of a forbidden band of the first N-type waveguide layer 21. The smaller the width of the forbidden band of the second N-type waveguide layer 22 and the width of the forbidden band of the first N-type waveguide layer 21, the smaller the junction resistance between the second N-type waveguide layer 22 and the P-type waveguide layer 4. In this embodiment, the materials of the second N-type waveguide layer 22 and the P-type waveguide layer 4 are both AlGaAs system materials. Therefore, the widths of the forbidden bands of the second N-type waveguide layer 22 and the P-type waveguide layer 4 are relatively small, so that the junction resistance between the second N-type waveguide layer 22 and the P-type waveguide layer 4 is relatively small.

In this embodiment, the junction resistance between the first confining layer 5 and the first N-type waveguide layer 21 is relatively small, the junction resistance between the second confining layer 6 and the P-type waveguide layer 4 is relatively small, the resistance of the bulk material of the first N-type waveguide layer 21 is relatively small, a proportion of the bulk material of the P-type waveguide layer 4 of the second N-type waveguide layer 22 is relatively small, and the junction resistance between the second N-type waveguide layer 22 and the P-type waveguide layer 4 is relatively small. Therefore, a total resistance of the semiconductor structure is relatively small.

In an embodiment, the thickness of the P-type waveguide layer 4 is 0.2 μm to 1 μm. A doping concentration of the P-type waveguide layer 4 is 0.5E17 atom/cm³ to 10E17 atom/cm³.

In an embodiment, the semiconductor structure further includes: a buffer layer 5. The buffer layer 7 is arranged between the semiconductor substrate layer 1 and the first confining layer 5.

In an embodiment, a material of the buffer layer 7 includes a gallium arsenide (GaAs).

In an embodiment, the semiconductor structure further includes: an electrode contact layer 8. The electrode contact layer 8 is arranged on a surface of the second confining layer 8 on a side away from the semiconductor substrate layer 1.

In an embodiment, a material of the electrode contact layer 8 includes a gallium arsenide (GaAs).

Figure 3:
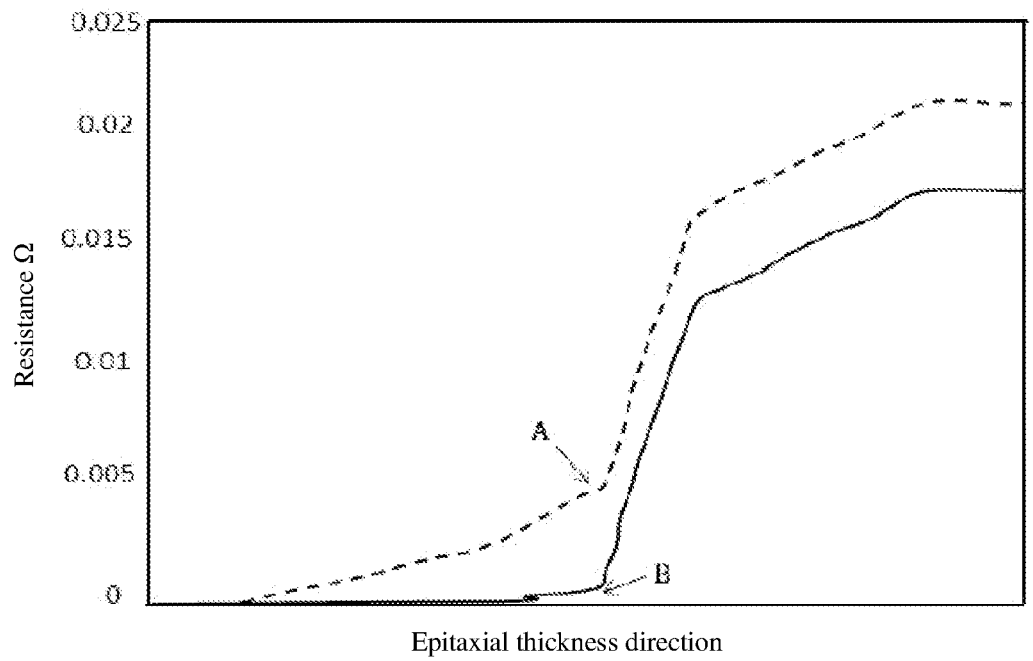
FIG. 3 is a comparison diagram of a resistance integral curve of a semiconductor structure provided by a comparative example and a resistance integral curve of a semiconductor structure provided by this application.

FIG. 3 is a comparison diagram of a resistance integral curve (shown by a dotted line in FIG. 3) of a semiconductor structure provided by a comparative example and a resistance integral curve (shown by a solid line in FIG. 3) of a semiconductor structure provided by this application. A horizontal axis in FIG. 3 is an epitaxial thickness direction, and a direction of the horizontal axis from left to right represents a direction from the semiconductor substrate layer to the electrode contact layer. The semiconductor structure provided by the comparative example includes: a semiconductor substrate layer; and a buffer layer, an N-type confining layer, an N-type waveguide layer, an active layer, a P-type waveguide layer, a P-type confining layer, and an electrode contact layer that are arranged on the semiconductor substrate layer. The semiconductor substrate layer in the comparative example is consistent with the semiconductor substrate layer in this application, the buffer layer in the comparative example is consistent with the buffer layer in this application, and the electrode contact layer in the comparative example is consistent with the electrode contact layer in this application.

The N-type confining layer, the N-type waveguide layer, the active layer, the P-type waveguide layer, and the P-type confining layer that are in the comparative example are all AlGaAs system materials. A width of the semiconductor structure in a slow axis direction in the comparative example is 200 μm, and a cavity length of the semiconductor structure in a light emitting direction in the comparative example is 2 mm. A width of the semiconductor structure in the slow axis direction provided by this application is 200 μm, and a cavity length of the semiconductor structure in the light emitting direction provided by this application is 2 mm. Referring to FIG. 3, a resistance of the semiconductor structure in the comparative example is 0.0214Ω, and a resistance of the semiconductor structure provided by this application is 0.0177Ω. It can be seen that the semiconductor structure provided by this application greatly reduces the resistance of the semiconductor structure. It can be seen from FIG. 3 that a curve segment between a start point and an inflection point A in the resistance integral curve of the semiconductor structure provided by the comparative example represents a total resistance of the semiconductor substrate layer, the buffer layer, the N-type confining layer, and the N-type waveguide layer, a curve segment between the start point and an inflection point B in a resistance integral curve of the semiconductor structure provided by this application represents a total resistance of the semiconductor substrate layer, the buffer layer, the first confining layer, and the N-type waveguide structure. It can be seen that since the N-type waveguide structure in this application includes the first N-type waveguide layer 21 and the second N-type waveguide layer 22 that are stacked, a relatively large contribution is made to reduction of the resistance of the semiconductor structure provided by this application.

Figure 4:
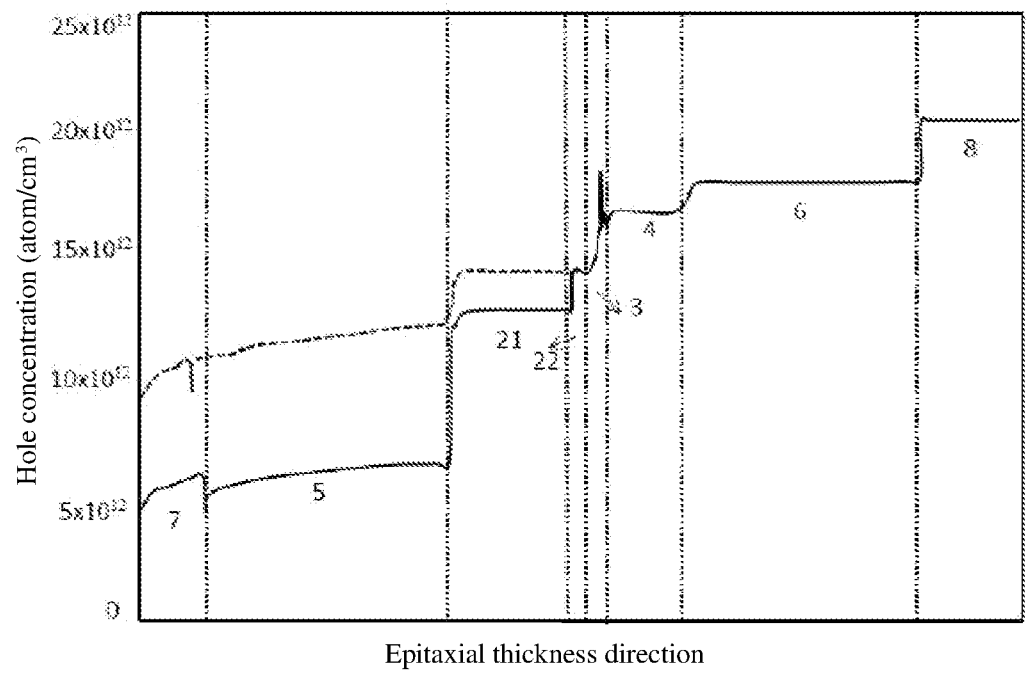
FIG. 4 is a schematic diagram of a hole concentration curve in a semiconductor structure provided by a comparative example and a hole concentration curve in a semiconductor structure provided by this application.

FIG. 4 is a schematic diagram of a hole concentration curve (shown by a solid line) in the semiconductor structure in this application and a hole concentration curve (shown by a dotted line) in the semiconductor structure in the comparative example. A horizontal axis in FIG. 4 is a position in an epitaxial thickness direction. There are hole concentrations of the buffer layer 7, the first confining layer 5, the first N-type waveguide layer 21, the second N-type waveguide layer 22, the active layer 3, the P-type waveguide layer 4, the second confining layer 6, and the electrode contact layer 8 on the solid line from left to right in FIG. 4. There are hole concentrations of the buffer layer, the N-type confining layer, the N-type waveguide layer, the active layer, the P-type waveguide layer, the P-type confining layer, and the electrode contact layer on the dotted line from left to right in FIG. 4. The hole concentration of the N-type waveguide layer in the semiconductor structure in the comparative example is $1.5 \times 10^{12}$ atoms/cm$^3$. The hole concentration of the N-type waveguide structure in the semiconductor structure provided by this application is $3 \times 10^{12}$ atoms/cm$^3$. In the semiconductor structure provided by this application, due to a difference between the valence bands of the first N-type waveguide layer and the second N-type waveguide layer in the N-type waveguide structure, the hole concentration of the N-type waveguide structure is relatively low. The hole concentration in the N-type waveguide layers in the semiconductor structure in this application is decreased.

A process for manufacturing the semiconductor structure is described below in detail with reference to FIG. 5 to FIG. 10.

Figure 5:
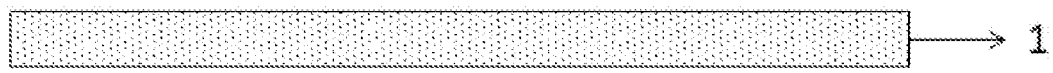
FIG. 5 to FIG. 10 are schematic structural diagrams of manufacturing a semiconductor structure according to this application.

Referring to FIG. 5, a semiconductor substrate layer 1 is provided.

In this embodiment, an example in which the semiconductor substrate layer 1 is a gallium arsenide (GaAs) substrate is used. A material of the semiconductor substrate layer 1 is not limited in this embodiment, as long as an upper layer material can grow.

Figure 6:
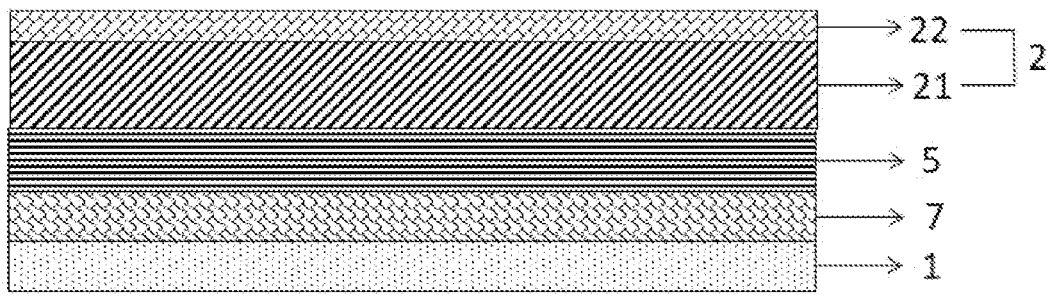

Referring to FIG. 6, an N-type waveguide structure 2 is formed on the semiconductor substrate layer 1, where a process for forming the N-type waveguide structure 2 includes: forming a first N-type waveguide layer 21 on the semiconductor substrate layer 1; and forming a second N-type waveguide layer 22 on a surface of the first N-type waveguide layer 21 on a side away from the semiconductor substrate layer 1, where a conduction band level of the first N-type waveguide layer 21 is the same as a conduction band level of the second N-type waveguide layer 22, and a valence band level of the first N-type waveguide layer 21 is lower than a valence band level of the second N-type waveguide layer 22. In this embodiment, a material of the first N-type waveguide layer 21 includes $Al_{x1}Ga_{x2}In_{1-x1-x2}P$ doped with N-type conductive ions, and a material of the second N-type waveguide layer 22 includes $Al_yGa_{1-y}As$ doped with N-type conductive ions.

In this embodiment, the steps of forming a first N-type waveguide layer 21 and a second N-type waveguide layer include: step 1: introducing an indium source gas, a gallium source gas, an aluminum source gas and a phosphorus source gas; step 2: turning off the indium source gas; step 3: turning off the gallium source gas and the aluminum source gas; step 4: turning off the phosphorus source gas; step 5: introducing an arsenic source gas; and step 6: introducing the gallium source gas and the aluminum source gas.

Compared with an aluminum atom and a gallium atom, an indium atom is larger in size and weaker in bond energy, and the indium atom is not easily combined with a phosphorus atom. Therefore, the indium atom is easily enriched on a surface of an epitaxial growth film layer. In this embodiment, the indium source gas is turned off first, and then the gallium source gas and the aluminum source gas are turned off. Therefore, even if the indium source gas is turned off in the second step, the gallium source gas, the aluminum source gas, and the phosphorus source gas also react with indium that has been enriched before the second step, to form $Al_{x1}Ga_{x2}In_{1-x1-x2}P$. In this way, in the fourth step, the enrichment of indium on the surface of the first N-type waveguide layer 21 is avoided, to avoid formation of indium at an interface between the second N-type waveguide layer 22 and the first N-type waveguide layer 21, avoid incorporation of indium at the interface between the second N-type waveguide layer 22 and the first N-type waveguide layer 21 into the material of the second N-type waveguide layer 22, avoid formation of InAlGaAs at the interface between the second N-type waveguide layer 22 and the first N-type waveguide layer 21, prevent InAlGaAs from restricting flowing of electrons, and avoid increasing an operating voltage of the semiconductor structure.

In this embodiment, after the gallium source gas and the aluminum source gas are turned off, the phosphorus source gas is turned off, to purge the surface of the first N-type waveguide layer 21 with the phosphorus source gas after the first N-type waveguide layer 21 is formed, so that aluminum, gallium, and indium atoms are fully incorporated into the first N-type waveguide layer 21, and excessive phosphorus source gas is introduced to suppress subsequent parasitic reactions.

In this embodiment, the arsenic source gas is introduced before the second N-type waveguide layer 22 is formed, so that all phosphorus source gas in a reaction chamber can be exhausted, thereby preventing doping of phosphorus atoms during formation of the second N-type waveguide layer 22.

A time between an end moment of step 2 and an end moment of step 3 ranges from 0.2 seconds to 3 seconds; a time between the end moment of step 3 to an end moment of step 4 ranges from 0.1 seconds to 30 seconds; and a duration of step 5 ranges from 0.1 seconds to 30 seconds. A duration of step 5 ranges from 0.1 seconds to 30 seconds. A purpose of this setting is to introduce enough arsenic source gases before the second N-type waveguide layer is formed, to discharge the phosphorus source gas in the reaction chamber, to prevent doping of phosphorus atoms during formation of the second N-type waveguide layer.

In this embodiment, the method further includes: forming a buffer layer 7 on the semiconductor substrate layer 1 before forming the N-type waveguide structure 2; forming a first confining layer 5 on a side, away from the semiconductor substrate layer 1, of the buffer layer 7, where a difference between the conduction band level of the first N-type waveguide layer 21 and a conduction band level of the first confining layer 5 is less than a difference between the valence band level of the first N-type waveguide layer 21 and a valence band level of the first confining layer 5.

For a component, a thickness, and a doping concentration of the first confining layer 5, refer to the foregoing descriptions.

For a component, a thickness, and a doping concentration of the buffer layer 7, refer to the foregoing descriptions.

Figure 7:
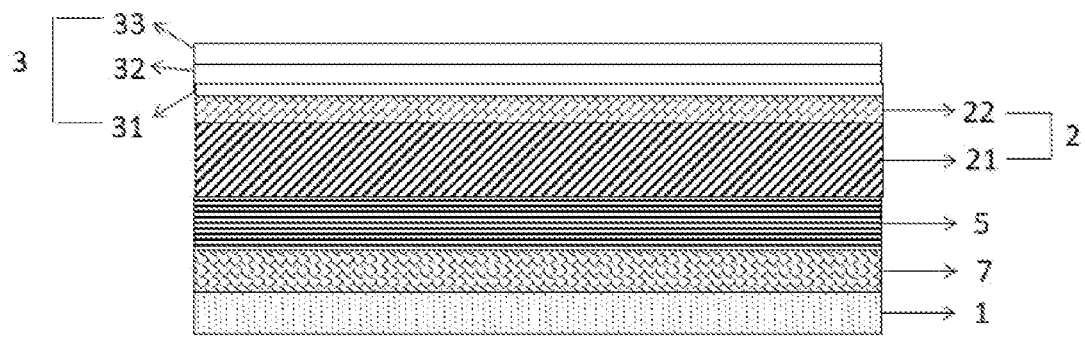

Referring to FIG. 7, an active layer 3 is formed on a surface of the N-type waveguide structure 2 on a side away from the semiconductor substrate layer 1.

In an embodiment, the active layer 3 includes a first barrier layer 31, a quantum well layer 32, and a second barrier layer 33.

The step of forming the active layer 3 includes: forming the first barrier layer 31 on a surface of the N-type waveguide structure 2 on a side away from the semiconductor substrate layer 1; forming the quantum well layer 32 on a surface of the first barrier layer 31 on a side away from the semiconductor substrate layer 1; and forming the second barrier layer 33 on a surface of the quantum well layer 32 on a side away from the first the barrier layer 31.

For a component, a thickness, and a doping concentration of each of the first barrier layer 31, the quantum well layer 32, and the second barrier layer 33, refer to the foregoing descriptions.

Figure 8:
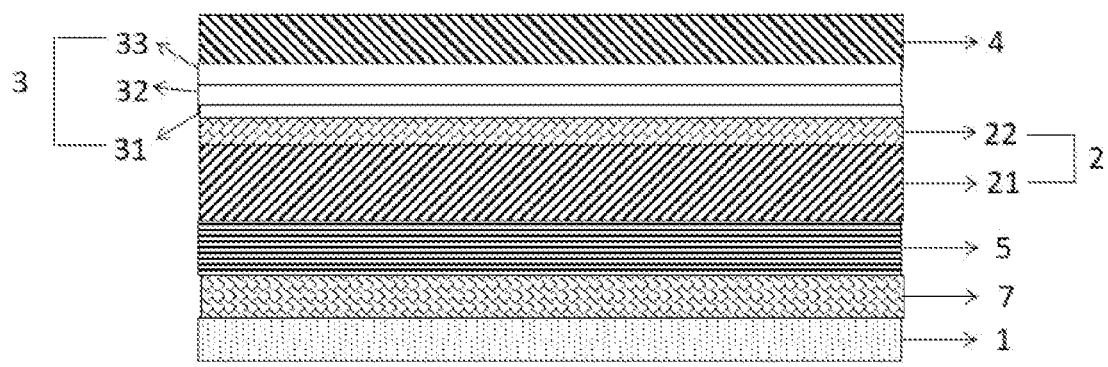

Referring to FIG. 8, a P-type waveguide layer 4 is formed on a surface of the active layer 3 on a side away from the semiconductor substrate layer 1.

In an embodiment, the thickness of the P-type waveguide layer 4 is less than the thickness of the N-type waveguide structure 2.

For a component, a thickness, and a doping concentration of the P-type waveguide layer 4, refer to the foregoing descriptions.

Figure 9:
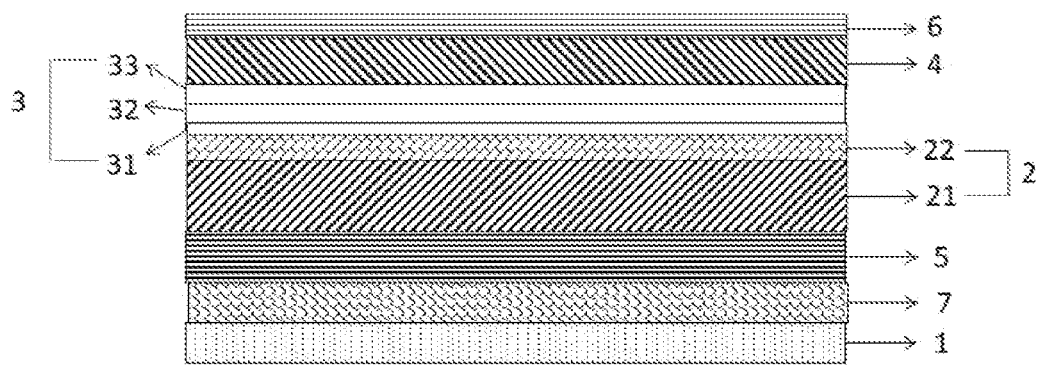

Referring to FIG. 9, a second confining layer 6 is formed on a surface of the P-type waveguide layer 4 on a side away from the semiconductor substrate layer 1, where a difference between a valence band level of the second confining layer 6 and a valence band level of the P-type waveguide layer 4 is less than a difference between a conduction band level of the second confining layer 6 and a conduction band level of the P-type waveguide layer 4.

For a component, a thickness, and a doping concentration of the second confining layer 6, refer to the foregoing descriptions.

Figure 10:
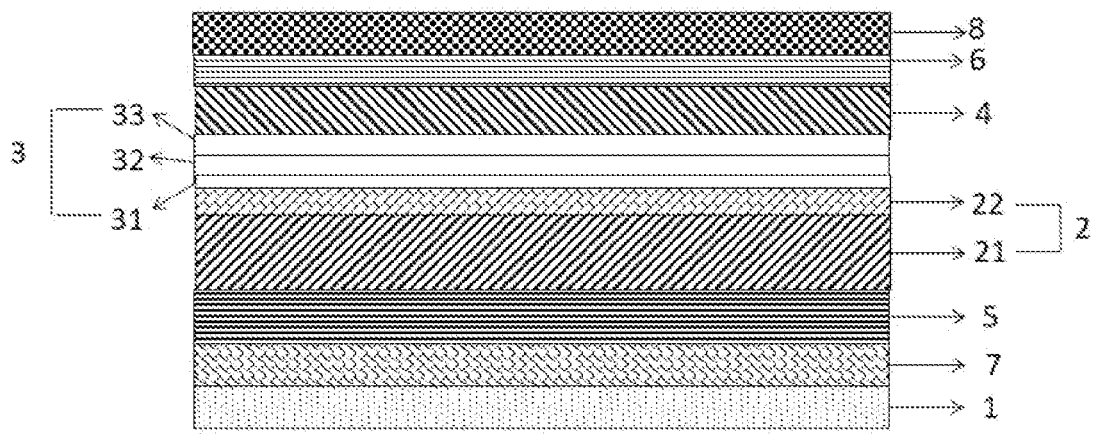

Referring to FIG. 10, an electrode contact layer 8 is formed on a surface of the second confining layer 6 on a side away from the semiconductor substrate layer 1.

In an embodiment, a material of the electrode contact layer 8 includes a gallium arsenide (GaAs).

Obviously, the foregoing embodiments are only examples for clear description, and are not intended to limit the implementation manners. For those of ordinary skill in the art, changes or modifications in other different forms can also be made on the basis of the above descriptions. There is no need and cannot be exhaustive of all implementation manners herein. However, obvious changes or modifications derived from this still fall within the protection scope of this application.

The invention claimed is:

1. A semiconductor structure, comprising:
a semiconductor substrate layer;
an N-type waveguide structure arranged on the semiconductor substrate layer; and
an active layer arranged on a surface of the N-type waveguide structure on a side away from the semiconductor substrate layer, wherein
the N-type waveguide structure comprises a first N-type waveguide layer and a second N-type waveguide layer that are stacked, the second N-type waveguide layer is arranged between the first N-type waveguide layer and the active layer, a conduction band level of the first N-type waveguide layer is the same as a conduction band level of the second N-type waveguide layer, and a valence band level of the first N-type waveguide layer is lower than a valence band level of the second N-type waveguide layer;
wherein the semiconductor structure further comprises a first confining layer arranged between the N-type waveguide structure and the semiconductor substrate layer, wherein a difference between the conduction band level of the first N-type waveguide layer and a conduction band level of the first confining layer is less than a difference between the valence band level of the first N-type waveguide layer and a valence band level of the first confining layer, wherein the valence band level of the first N-type waveguide layer is higher than the valence band level of the first confining layer.

2. The semiconductor structure according to claim 1, wherein a difference between the valence band level of the second N-type waveguide layer and the valence band level of the first N-type waveguide layer ranges from 0.04 eV to 0.3 eV.

3. The semiconductor structure according to claim 1, wherein a material of the first N-type waveguide layer comprises $Al_{x1}Ga_{x2}In_{1-x1-x2}P$ doped with N-type conductive ions, and a material of the second N-type waveguide layer comprises $Al_yGa_{1-y}As$ doped with N-type conductive ions.

4. The semiconductor structure according to claim 3, wherein a value of x1 ranges from 0 to 0.2, and a value of y ranges from 0.2 to 0.5.

5. The semiconductor structure according to claim 1, wherein a thickness of the first N-type waveguide layer is greater than a thickness of the second N-type waveguide layer.

6. The semiconductor structure according to claim 1, wherein a material of the first confining layer is $Al_{x3}Ga_{x4}In_{1-x3-x4}P$ doped with N-type conductive ions.

7. The semiconductor structure according to claim 1, further comprising: a P-type waveguide layer arranged on a surface of the active layer on a side away from the semiconductor substrate layer, and a second confining layer arranged on a surface of the P-type waveguide layer on a side away from the semiconductor substrate layer, wherein a difference between a valence band level of the second confining layer and a valence band level of the P-type waveguide layer is less than a difference between a conduction band level of the second confining layer and a conduction band level of the P-type waveguide layer.

8. The semiconductor structure according to claim 7, wherein a material of the P-type waveguide layer comprises $Al_{z1}Ga_{1-z1}As$ doped with P-type conductive ions, and a material of the second confining layer comprises $Al_{z2}Ga_{1-z2}As$ doped with P-type conductive ions.

9. The semiconductor structure according to claim 7, wherein a thickness of the P-type waveguide layer is less than a thickness of the N-type waveguide structure.

10. A method for manufacturing a semiconductor structure, comprising:
providing a semiconductor substrate layer;
forming an N-type waveguide structure on the semiconductor substrate layer, wherein a process for forming the N-type waveguide structure comprises: forming a first N-type waveguide layer on the semiconductor substrate layer; and forming a second N-type waveguide layer on a surface of the first N-type waveguide layer on a side away from the semiconductor substrate layer, wherein a conduction band level of the first N-type waveguide layer is the same as a conduction band level of the second N-type waveguide layer, and a valence band level of the first N-type waveguide layer is lower than a valence band level of the second N-type waveguide layer; and
forming an active layer on a surface of the N-type waveguide structure on a side away from the semiconductor substrate layer;
wherein the method further comprises: before forming the N-type waveguide structure, forming a first confining layer on the semiconductor substrate layer, wherein a difference between the conduction band level of the first N-type waveguide layer and a conduction band level of the first confining layer is less than a difference between the valence band level of the first N-type waveguide layer and a valence band level of the first confining layer, wherein the valence band level of the first N-type waveguide layer is higher than the valence band level of the first confining layer.

11. The method for manufacturing a semiconductor structure according to claim 10, wherein a material of the first N-type waveguide layer comprises $Al_{x1}Ga_{x2}In_{1-x1-x2}P$ doped with N-type conductive ions, and a material of the second N-type waveguide layer comprises $Al_yGa_{1-y}As$ doped with N-type conductive ions; and
the steps of forming a first N-type waveguide layer and a second N-type waveguide layer comprise: step 1: introducing an indium source gas, a gallium source gas, an aluminum source gas and a phosphorus source gas; step 2: turning off the indium source gas; step 3: turning off the gallium source gas and the aluminum source gas; step 4: turning off the phosphorus source gas;
step 5: introducing an arsenic source gas; and step 6: introducing the gallium source gas and the aluminum source gas.

12. The method for manufacturing a semiconductor structure according to claim 11, wherein a time between an end moment of step 2 and an end moment of step 3 ranges from 0.2 seconds to 3 seconds; a time between the end moment of step 3 and an end moment of step 4 ranges from 0.1 seconds to 30 seconds; and a duration of step 5 ranges from 0.1 seconds to 30 seconds.

13. The method for manufacturing a semiconductor structure according to claim 10, further comprising: forming a P-type waveguide layer on a surface of the active layer on a side away from the semiconductor substrate layer, and forming a second confining layer on a surface of the P-type waveguide layer on a side away from the semiconductor substrate layer, wherein a difference between a valence band level of the second confining layer and a valence band level of the P-type waveguide layer is less than a difference between a conduction band level of the second confining layer and a conduction band level of the P-type waveguide layer.

14. The method for manufacturing a semiconductor structure according to claim 13, wherein a thickness of the P-type waveguide layer is less than a thickness of the N-type waveguide structure.

* * * * *